United States Patent [19]

Kröpfl

[11] 4,152,205
[45] May 1, 1979

[54] SPACER SUPPORT FOR WATER-COOLED NUCLEAR REACTOR FUEL ELEMENTS

[75] Inventor: Hans Kröpfl, Erlangen, Fed. Rep. of Germany

[73] Assignee: Kraftwerk Union Aktiengesellschaft, Mülheim, Fed. Rep. of Germany

[21] Appl. No.: 816,180

[22] Filed: Jul. 15, 1977

[30] Foreign Application Priority Data

Jul. 15, 1976 [DE] Fed. Rep. of Germany ....... 2631925

[51] Int. Cl.² .............................................. G21C 3/02
[52] U.S. Cl. ......................................... 176/76; 176/78
[58] Field of Search ................................... 176/76, 78

[56] References Cited

U.S. PATENT DOCUMENTS

| | | | |
|---|---|---|---|
| 3,350,275 | 10/1967 | Venier et al. | 176/78 |
| 3,380,890 | 4/1968 | Glandin et al | 176/78 |
| 3,679,546 | 7/1972 | Muellner et al. | 176/76 X |
| 3,929,569 | 12/1975 | Piepers et al. | 176/78 |
| 3,966,550 | 6/1976 | Foulds et al. | 176/78 |
| 4,061,536 | 12/1977 | Greagan et al. | 176/78 |

Primary Examiner—Peter A. Nelson
Attorney, Agent, or Firm—Herbert L. Lerner

[57] ABSTRACT

Nuclear reactor fuel element having a spacer including a grid formed of edgewise disposed sheetmetal webs of material having minimal neutron absorption, and resilient contact elements of different material applied to the grid and extending in axial direction of the mesh of the grid, the mesh of the grid being defined by mesh walls formed with rectangular openings extending in longitudinal direction of the fuel element, the resilient contact elements comprising respective resilient strips self-lockingly snapped into the openings and including wave-shaped parts thereof extending from one to the other side of the mesh walls and respective parts that are not wave-shaped connected to opposite ends of the wave-shaped part thereof and contacting respective webs of the grid.

6 Claims, 9 Drawing Figures

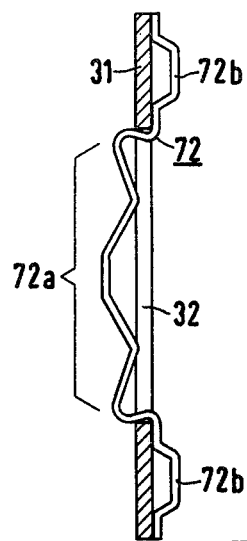
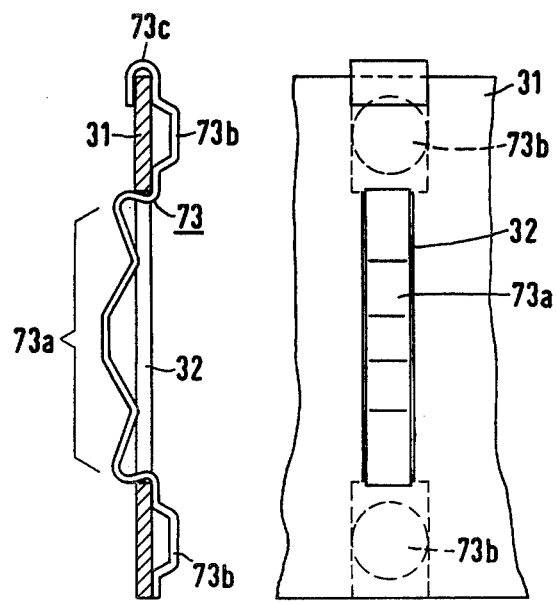
Fig. 6
Fig. 7   Fig. 7a

SPACER SUPPORT FOR WATER-COOLED NUCLEAR REACTOR FUEL ELEMENTS

The invention relates to a spacer or spacer support, especially for water-cooled nuclear reactor fuel assemblies formed of a grid of edgewise disposed sheetmetal webs of material having minimal neutron absorption, preferably a zirconium alloy, and of resilient or springy contact elements of other materials which are applied therein and extend in the axial or longitudinal direction of the mesh of the grid. Such spacers have become known, heretofore, for example, from the German Published Prosecuted Application DT-AS 1,489,632, wherein use was made of the principle, known also from considerably earlier publications, of making the spacer grid per se of a material that absorbs as few neutrons as possible and to fabricate the resilient contact elements of a correspondingly harder material which can have a considerably higher absorption cross section. Since it is difficult to join such different materials metallurgically, a simple plug connection was proposed, the loosening of which was supposed to be prevented by a bent-over end of the resilient contact strip.

This construction, however, posed great difficulties in assembly as well as in accurately establishing the radial insertion location as seen from the fuel rod, not to mention that also the axial support of the contact springs during the operation of the reactor might be very unreliable.

The problem therefore arose of finding a spacer construction with parts of different materials, with which these difficulties are circumvented, and which furthermore permits the use of the generally known "three-point support" (note the German Published Non-Prosecuted Application DT-OS 1,589,051).

It is accordingly an object of the invention to provide a spacer or spacer support for nuclear reactor fuel assemblies which meets the latter requirements.

With the foregoing and other objects in view, there is provided, in accordance with the invention, in a nuclear reactor fuel element, a spacer comprising a grid formed of edgewise disposed sheetmetal webs of material having minimal neutron absorption, and resilient contact elements of different material applied to the grid and extending in axial direction of the mesh of the grid, the mesh of the grid being defined by mesh walls formed with rectangular openings extending in longitudinal direction of the fuel element, the resilient contact elements comprising respective resilient strips self-lockingly snapped into the openings and including a wave-shaped part thereof extending from one to the other side of the mesh walls and respective parts that are not wave-shaped connected to opposite ends of the wave-shaped part thereof and contacting respective webs of the grid.

In accordance with other features of the invention, the fuel element is for a water-cooled nuclear reactor and the material having minimal neutron absorption is formed of zirconium alloy.

In accordance with additional features of the invention, at least one of the parts that are not wave-shaped is bent about the edge of the respective web or is suspended therefrom.

In accordance with a concomitant feature of the invention, the parts that are not wave-shaped and contact the respective webs of the grid are formed with rigid contact projections i.e. either provided therewith or constructed therewith.

Other features which are considered as characteristic for the invention are set forth in the appended claims.

Although the invention is illustrated and described herein as spacer support for water-cooled nuclear reactor fuel elements, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which.

Figure 3:
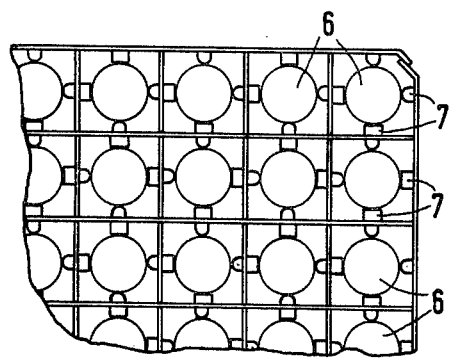
Figure 4:
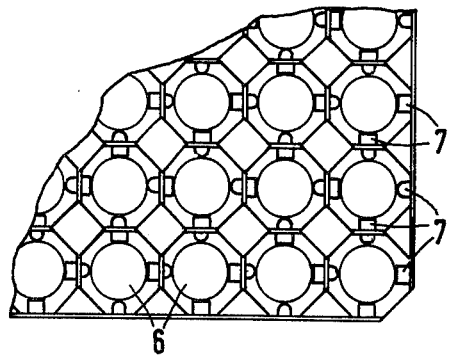
Figure 5:
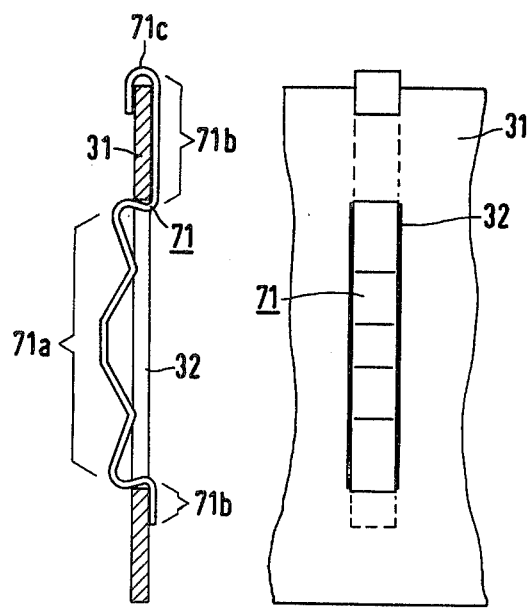
Figure 5A:
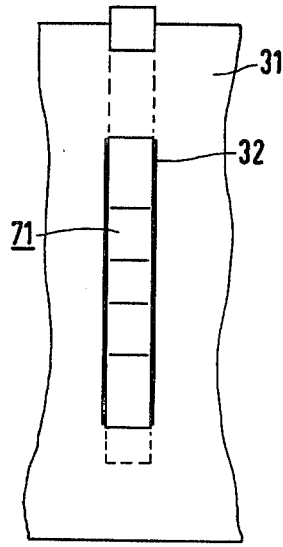

FIGS. 3 and 4 are purely diagrammatic top plan views of two possible spacer geometries with resilient contact elements as well as rigid contact projections; and FIGS. 5, 6 and 7 are side elevational views of three embodiments of resilient contact elements according to the invention that are to be mounted in the spacer grid; and FIGS. 5a and 7a are front elevational views, respectively, of FIGS. 5 and 7.

Figure 1:
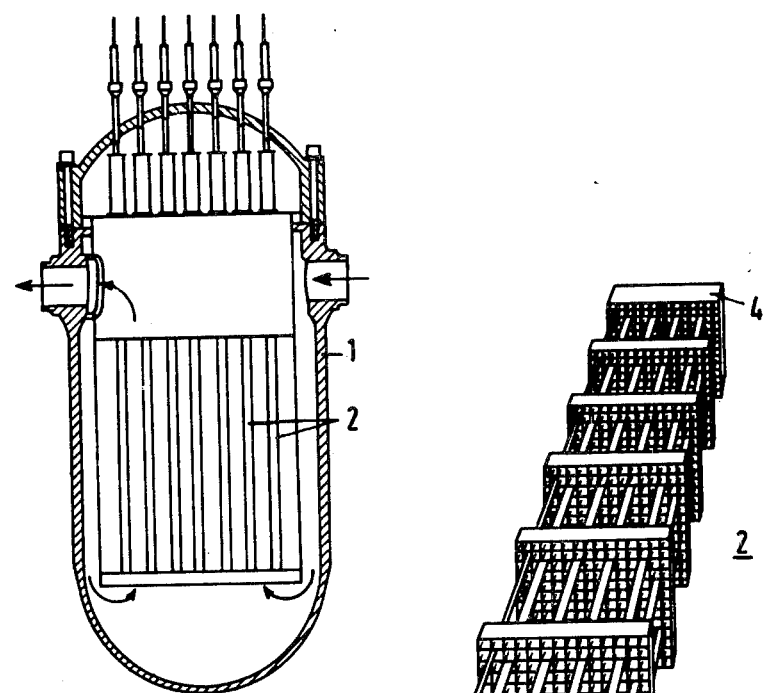
FIG. 1 is a diagrammatic longitudinal sectional view of a pressurized-water-cooled reator.
Figure 2:
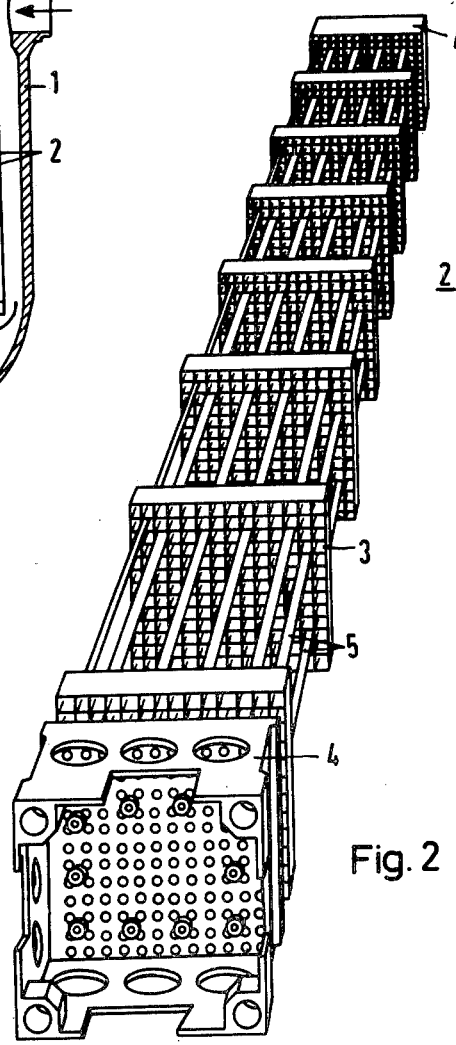
FIG. 2 is an enlarged perspective view of a fuel assembly suited for the reactor of FIG. 1 in which, especially, the position of the spacer grids can be seen clearly.

Referring now to the drawing and first, particularly, to FIG. 1 thereof, there is shown a pressurized water nuclear reactor wherein fuel assemblies 2 form the core of the pressurized water reactor and are disposed inside a pressure vessel 1, cooling water flowing through the fuel elements from the bottom to the top thereof in the manner represented by the arrows. One possible fuel element construction is shown in FIG. 2. The fuel element is formed of a framework made up of a head plate 4 and a base plate 4', as well as control rod guide tubes 5 connecting the head plate 4 and the base plate 4' to one another. At fuel rod positions, these control rod guide tubes extend through a number of mutually spaced superimposed spacer grids 3. In the view of FIG. 2, the mesh of the spacers are readily seen. The nuclear reactor fuel rods which pass through the latter have not been illustrated in the interest of greater clarity. These fuel rods, however, are held or supported in the individual mesh of the spacers for the purpose of centering and damping vibrations by means of resilient and rigid contact elements, the resilient contact elements usually engage the fuel rod in the middle of the spacer grid, the rigid contact elements or projections, on the other hand, engaging the fuel rod above and below this point; whence the name of the system: "three-point support". It has become known heretofore (note the Published Non-Prosecuted German Application cited hereinabove) to manufacture the spacer grids and the rigid as well as the resilient contact elements all of the same material i.e. a spring-elastic material. However, since such material has a relatively large neutron absorption cross section, proposals have been made earlier, as mentioned hereinabove, to make only the resilient parts out of this material.

FIGS. 3 and 4 show the disposition of the contact elements 7 and 7' within the individual mesh of the spacers in two different structural forms of the grids, respectively, in square and octagonal geometry. In these figures, the fuel rods 6 are shown in circular outlines, the resilient contact elements 7 are shown as small rectangles, and the rigid contact projections 7' as semicircles. From this, it is readily apparent that a rigid contact element 7' is always disposed opposite a resilient contact element 7. This principle is obviously applicable also to other types of grid geometries, such as also that of the hereinafore cited Published Prosecuted German Application DT-AS 1,489,632.

The additional FIGS. 5, 5a, 6, 7 and 7a show different possible embodiments of the resilient contact elements as well as the attachment thereof in the wall of the grid mesh of the spacer according to the invention. Like or corresponding parts are provided with the same reference characters in thes figures. Thus, each of FIGS. 5, 5a, 6, 7 and 7a shows a wall 31 of the spacer grid mesh, and a rectangular opening 32 intended for the insertion of a spring element 71, 72, 73, respectively, therein.

The spring element 71 shown in FIGS. 5 and 5a in a side elevational, partly sectional view and in a front elevational view, respectively, and snapped into place with the wave-shaped part 71a thereof in the rectangular opening 32. The flat parts 71b and 71b' engage the mesh wall 31, an end 71c adjacent the flat part 71b being bent over. Through the suspension of the spring element or spring strip 71 in this manner, additional fastening reliability is obtained. The wave in the spring part 71a is such that, upon being subjected to pressure by a non-illustrated contacting fuel rod, applied in direction toward the mesh wall 31, this element section i.e. the spring part 71a, is lengthened, so that thereby the engagement between this element section 71a and the upper and lower edge portion of the mesh wall 31 defining the rectangular opening 32 is increased in the sense of strengthening the locking section, somewhat similar to the principle of a snap fastener.

The spring element 72 shown in FIG. 6 in side elevational view has the same shape as that of FIG. 5 insofar as the wave-shaped or corrugated contact part 72a is concerned, and also the locking in the opening 32 is the same. The non-corrugated or non-wave-shaped spring portions adjoining both sides of the contact part 72a, however, are shaped to form contact projections 72b, which project into the adjacent mesh space and also engage a fuel rod therein.

FIGS. 7 and 7a also show a partly sectional side elevational view and a front elevational view, respectively, of the spring element 73, which again, has a wave-shaped or corrugated part 73a, as well as two projections 73b. It is bent with an end portion 73c additionally over the upper edge of the web or suspended therefrom in this manner. In the region of the projections 73b, the spring element is made wider, note FIG. 7a, the width depending upon the required height of stamped-out projections 73b. The projections 73b are made in the form of cups in the instant embodiment of the invention, however, it is obvious that a simple folding of the spring strip material could also be provided for shaping these projections.

In order to provide some idea of the order of magnitude of these spacer or spacer holder elements, it should be noted that the width of the sheet-metal webs 31 forming the mesh is about 30 mm; the rectangular opening 32 has approximately the dimensions 3×15 mm. The installation or assembly of the spring inserts 71, 72, 73 is very simple: the spring elements are forced sequentially into the respective openings 32 of the mesh walls in accordance with the construction shown in FIGS. 3 and 4. They are self-locking in this position, the holding forces being further reinforced by the elastic deformation of the spring parts 71a, 72a, 73a when the fuel rods are inserted during final assembly of the fuel element. In principle, this is achieved by providing for the length of the resilient or springy part to be somewhat greater than the length of the opening 32 and, thereby, a self-locking contact of the spring part in the mesh wall is provided.

In contrast to the state of the art mentioned in the introduction hereto, trouble-free mounting of the spring elements with a minimum amount of material is achieved, and in addition, the possibility of forming rigid projections at the spring elements for the so-called three-point support of the fuel rods is provided. Obviously, variations can also be effected with regard to the waviness or corrugation of the spring part, just as it is also possible to make changes in the width thereof.

There are claimed:

1. In a nuclear reactor fuel element, a spacer comprising a grid formed of edgewise disposed sheetmetal webs of material having minimal neutron absorption, and resilient contact elements of different material applied to said grid and extending in axial direction of the mesh of said grid, the mesh of said grid being defined by mesh walls formed with rectangular openings extending in longitudinal direction of the fuel element, the resilient contact elements comprising respective resilient strips having means for snapping said strips self lockingly into said openings, said strips having a wave-shaped part thereof extending from one to the other side of said mesh walls and respective parts that are not wave-shaped connected to opposite ends of said wave-shaped part thereof and contacting respective webs of said grid.

2. Spacer according to claim 1 wherein the fuel element is for a water-cooled nuclear reactor.

3. Spacer according to claim 1 wherein said material having minimal neutron absorption is formed of zirconium alloy.

4. Spacer according to claim 1 wherein at least one of said parts that are not wave-shaped is bent about the edge of the respective web.

5. Spacer according to claim 1 wherein at least one of said parts that are not wave-shaped is suspended from the edge of the respective web.

6. Spacer according to claim 1 wherein said parts that are not wave-shaped and contact the respective webs of said grid are formed with rigid contact projections.

* * * * *